US012771761B2

(12) United States Patent
Feder et al.

(10) Patent No.: US 12,771,761 B2
(45) Date of Patent: Oct. 20, 2026

(54) SYSTEMS AND METHODS FOR MODIFYING SESSIONS IN ACCORDANCE WITH A USER PLANE FUNCTION SELECTION BASED ON LATENCY

(71) Applicant: Verizon Patent and Licensing Inc., Basking Ridge, NJ (US)

(72) Inventors: Peretz Feder, Englewood, NJ (US); Egemen Kemal Cetinkaya, Hillsborough, NJ (US); Anthony Clay Reynolds, Rhome, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 61 days.

(21) Appl. No.: 18/486,513

(22) Filed: Oct. 13, 2023

(65) Prior Publication Data

US 2025/0126187 A1 Apr. 17, 2025

(51) Int. Cl.
*H04L 69/16* (2022.01)

(52) U.S. Cl.
CPC .................................... *H04L 69/16* (2013.01)

(58) Field of Classification Search
CPC ........................................................ H04L 69/16
See application file for complete search history.

(56) References Cited

U.S. PATENT DOCUMENTS

2019/0174386 A1* 6/2019 Ramle ............... H04W 36/0055
2020/0245182 A1* 7/2020 Chitta ............... H04W 28/0252
2021/0321487 A1* 10/2021 Moon ................... H04W 76/11
2021/0392539 A1* 12/2021 Guo ...................... H04W 28/22
2022/0015163 A1* 1/2022 Zhang ...................... H04W 8/20
2022/0167446 A1* 5/2022 Youn ...................... H04W 76/16
2022/0345929 A1* 10/2022 Lee ....................... H04M 15/66
2022/0386096 A1* 12/2022 Mariyani ................ H04W 4/50
2023/0180038 A1* 6/2023 Chen ..................... H04W 24/08 370/252
2023/0209402 A1* 6/2023 Ronkainen ........ H04W 28/0831 370/229
2023/0319533 A1* 10/2023 Ly ........................... H04L 43/04 709/224

FOREIGN PATENT DOCUMENTS

GB 2627328 A * 8/2024 ............ H04W 24/08

OTHER PUBLICATIONS

3GPP, "5G; Procedures for the 5G System (5GS)," 2021. (Year: 2021).*
Dongwook Kim, "Edge Computing," Jun. 5, 2023. (Year: 2023).*

* cited by examiner

*Primary Examiner* — Andrew C Georgandellis

(57) ABSTRACT

In some implementations, a session management function (SMF) may transmit, to a network data analytics function (NWDAF), an analytics message that requests or subscribes to analytics for user equipment (UE) to user plane function (UPF) (UE-to-UPF) latency. The SMF may receive, from the NWDAF, analytics information in response to the analytics message, wherein the analytics information indicates present or future predicted UE-to-UPF latency information for one or more of a downlink direction or an uplink direction. The SMF may transmit a session modify message to modify a protocol data unit (PDU) session, wherein the PDU session is to be modified based on a UPF selection, and the UPF selection is based on the analytics information.

20 Claims, 8 Drawing Sheets

100

SYSTEMS AND METHODS FOR MODIFYING SESSIONS IN ACCORDANCE WITH A USER PLANE FUNCTION SELECTION BASED ON LATENCY

BACKGROUND

Wireless communication systems are widely deployed to provide various telecommunication services such as telephony, video, data, messaging, and broadcasts. A wireless network may include one or more network nodes that support communication for wireless communication devices, such as a user equipment (UE).

DETAILED DESCRIPTION OF EXAMPLE EMBODIMENTS

The following detailed description of example implementations refers to the accompanying drawings. The same reference numbers in different drawings may identify the same or similar elements.

A single protocol data unit (PDU) session may have multiple PDU session anchors. In order to support selective traffic routing to a data network (DN), a session management function (SMF) may control a data path of a PDU session so that the PDU session simultaneously corresponds to multiple interfaces providing access to multiple DNs. A user plane function (UPF) that terminates each of these interfaces may support PDU session anchor functionality.

An uplink classifier may be used for a PDU session. For PDU sessions, the SMF may determine to insert an uplink classifier (UL CL) or an uplink classifier UPF in a data path of a PDU session. The uplink classifier may be a functionality supported by an UPF that aims at diverting (locally) some traffic matching traffic filters provided by the SMF. The insertion and removal of the uplink classifier or the uplink classifier UPF may be decided by the SMF and controlled by the SMF using generic N4 and UPF capabilities. The SMF may decide to insert, in the data path of the PDU session, a UPF supporting the uplink classifier functionality during or after a PDU session establishment. The SMF may decide to remove, from the data path of the PDU session, the UPF supporting the uplink classifier functionality after the PDU session establishment. The SMF may include more than one UPF PSA supporting the uplink classifier functionality in the data path of the PDU session.

A user equipment (UE) may be unaware of the traffic diversion by the uplink classifier. The UE may not be involved in the insertion and removal of the uplink classifier. When the uplink classifier functionality has been inserted in the data path of the PDU session, multiple PDU session anchors may be present for the PDU Session. The PDU session anchors may provide different access to the same or different DN(s). The uplink classifier may provide forwarding of uplink traffic towards different PDU session anchors and merging of downlink traffic to the UE, e.g., merging the traffic from the different PDU session anchors on the link towards the UE, which may be based on traffic detection and traffic forwarding rules provided by the SMF.

Figure 1:
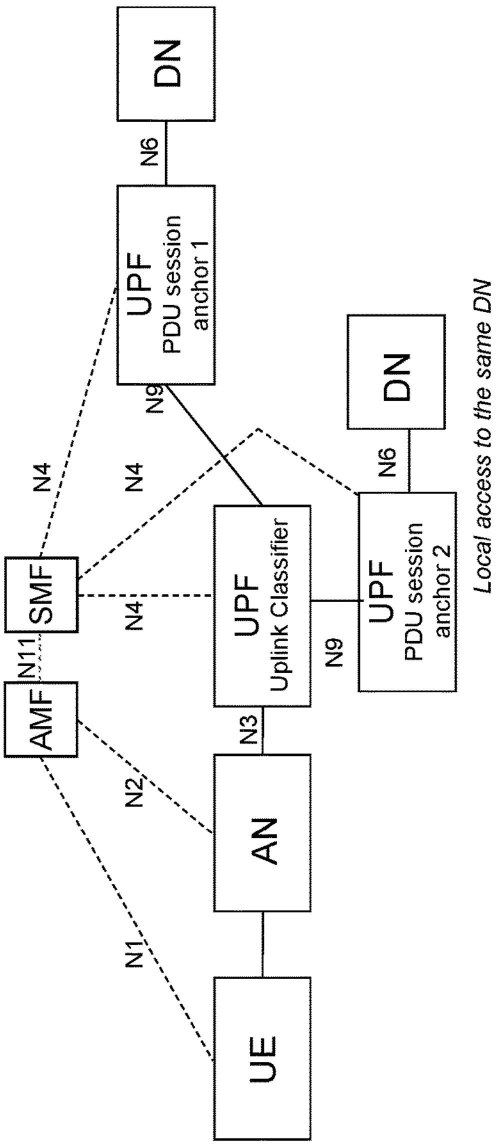
(PRIOR ART) FIG. 1
FIG. 1 is a diagram of an example associated with a user plane architecture incorporating an uplink classifier.

FIG. 1 is a diagram of an example 100 associated with a user plane architecture for an uplink classifier.

As shown in FIG. 1, an uplink classifier may be inserted in a data path of a PDU session. The uplink classifier may be a UL CL UPF function (or UL CL UPF), which may be inserted in the data path of the PDU session to allow a selection of an alternate PDU session anchor point for a particular flow. In this case, the PDU session may serve two or more flows at two or more different UPF anchor points. An example for such configuration is a mobile user that is surfing the internet through UPF1 connected to server DN1 with a high latency, but may want in addition to be served locally by UPF2 with lower latencies when playing a game with another local user at DN2.

As indicated above, FIG. 1 is provided as an example. Other examples may differ from what is described with regard to FIG. 1.

An SMF may determine an insertion and removal of an uplink classifier. The SMF may determine to insert, in a data path of a PDU session, a UPF supporting an uplink classifier functionality. The SMF may insert the UPF supporting the uplink classifier functionality during a PDU session establishment or after the PDU Session establishment. The SMF may determine to remove, from the data path of the PDU session, the UPF supporting the uplink classifier after the PDU session establishment.

However, the SMF may not follow a mechanism for determining an optimum path when inserting the uplink classifier. The SMF may not be configured with rules to follow when determining the optimum path when inserting the uplink classifier. As a result, inserting the uplink classifier may increase latency, reduce throughput, or otherwise degrade a network performance.

In some implementations, a UPF selection may be optimized using a measurement of latency between a UPF and a UE. The UPF selection may be associated with an uplink classifier UPF insertion, where the UPF selection may serve to optimize the connection latency to application server. By using the measurement of latency between the UPF and the UE, an improved data path and UPF selection to a DN may be achieved.

In some implementations, a UE average uplink/downlink packet delay may be measured between the UPF and the UE, and based on this statistical measurement, the SMF may determine whether to insert an optimized uplink classifier UPF for a particular flow. The measurement of the UE average uplink/downlink packet delay for the insertion of the uplink classifier UPF may be independent of uplink/ downlink packet delay measurements between a UPF PDU session anchor (PSA) and a UE for the purpose of measuring an end-to-end data volume transfer time, which may be used to assist an application function (AF) or a network function (NF) hosting an artificial intelligence or machine learning (AI/ML) based service such as member selection of federated learning. The measurement of the UE average uplink/downlink packet delay for the optimized SMF selection of UPFs and the possible insertion of the uplink classifier UPF may be independent of a specific volume transfer.

In some implementations, no specific volume of data may be transmitted, but rather an analytics entity such as a 5G network data analytics function (NWDAF) may collect ongoing statistical information of uplink/downlink latency of UE connectivity to various UPFs and DNs visited by UEs of interest. In some implementations, information may be collected per a 5G quality of service (QOS) identifier (5QI) flow granularity, where each flow may represent traffic to a specific type of application. In order to calculate a downlink traffic latency, the UPF may need to perform QoS monitoring to receive uplink and downlink information from a radio access network (RAN) in an uplink PDU session information. The RAN may be a Next Generation RAN (NG-RAN). For each general packet radio service (GPRS) tunneling protocol (GTP) PDU directed to a specific flow, the UPF may record various time stamps and information included in a GTP header. The time stamps may include T1, T2, T3, and T4. T1 may indicate a local time of a downlink GTP PDU sent by the UPF, as provided by a downlink sending time stamp repeated header field. T2 may indicate a local time that the downlink GTP packet is received by the RAN and reported back to the UPF in a downlink received time stamp field. T3 may be a local time stamp of a packet leaving the RAN in an uplink direction, as provided in an uplink sending time stamp header field. T4 may be a local time measured by the UPF of the packet arriving at the UPF from the RAN.

In some implementations, the uplink PDU session information may utilize a frame format that allows the UPF to receive control information elements which are associated with the transfer of a packet over an interface. The uplink PDU session information may be used to relay the downlink sending time stamp repeated header field, the downlink received time stamp field, the uplink sending time stamp header field, a downlink delay result, and an uplink delay result.

In some implementations, the UPF and/or the RAN may apply information collection to all QoS monitored packets of a particular flow or to a representative N samples of packets associated with the flow. The UPF may count a number of downlink samples received for a particular flow, and the UPF may add the downlink delay result (DL_delay_result), which may correspond to downlink Uu latency information extracted from a header field. The downlink delay result may correspond to a RAN to UE delay. The UPF may calculate a UPF-to-UE downlink latency, which may be equal to the sum of $\Sigma$ (T2−T1+DL_RAN_delay_result)/N. Further, the UPF may count a number of uplink samples received for a particular flow, and the UPF may add the uplink delay result (UL_delay_result), which may correspond to uplink Uu latency information extracted from a header field. The uplink delay result may correspond to a UE to RAN delay. The UPF may calculate a UE-to-UPF uplink latency, which may be equal to the sum of $\Sigma$ (T4−T3+UL_RAN_delay_result)/N. The UPF may calculate the UPF-to-UE downlink latency and the UE-to-UPF uplink latency based on continuous synchronization of clocks of the RAN and the UPF.

In some implementations, the NWDAF may use uplink and downlink UE-to-UPF and UPF-to-UE latency information to build statistics of typical latency values from the UE to the various UPFs. The NWDAF may use such information to predict expected uplink and downlink latencies from the UE to various UPFs. A user location may be added at each measurement, which may add spatial information per a UE specific location. The NWDAF may provide UE mobility prediction at different time slots, and the addition of latency prediction at the various locations and time slots may help the SMF to insert and remove UPFs for an optimized user experience linked to predicted location and time. During an active PDU session and based on obtained latency figures, the NWDAF may inform the SMF of different expected UE-to-UPF latency values, which may assist the SMF to determine an optimum data path traversal of a flow within the PDU session. The SMF may determine the data path traversal of the flow during a PDU session establishment or after the PDU session establishment.

In some implementations, by enabling the UPF selection to use a measurement of latency between the UPF and the UE, the SMF may be able to determine the optimum data path when inserting an uplink classifier. The SMF may insert the uplink classifier UPF based on the measurement of latency between the UPF and the UE, which may result in an insertion of an uplink classifier UPF and a local UPF PSA that enable to reduce latency, increases throughput, and/or otherwise improves an overall network performance.

Figure 2:
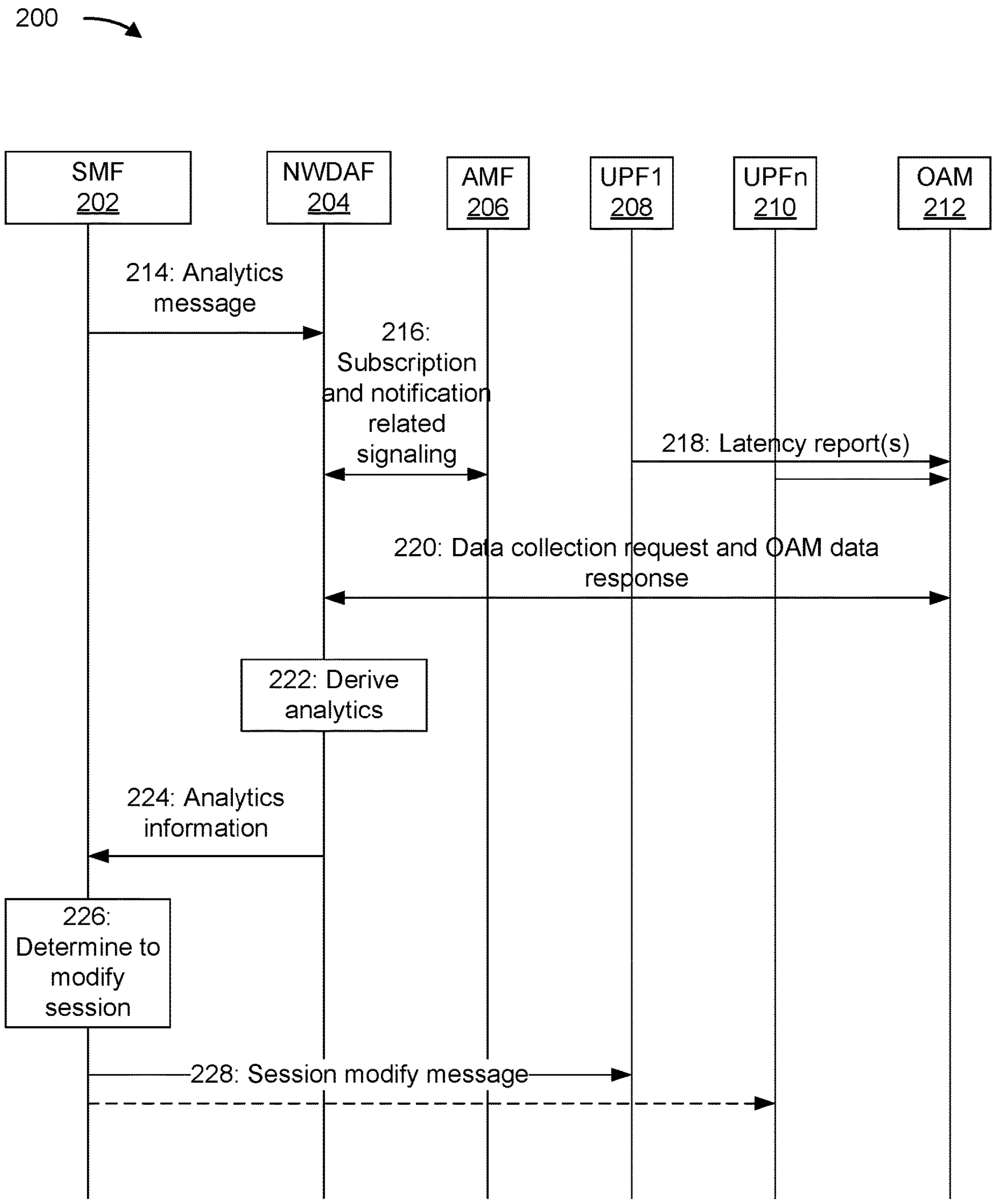
FIG. 2 is a diagram of an example associated with modifying sessions in accordance with a user plane function (UPF) selection based on latency.

FIG. 2 is a diagram of an example associated with modifying sessions in accordance with a UPF selection based on latency. As shown in FIG. 2, example 200 includes an SMF (e.g., SMF 202), an NWDAF (e.g., NWDAF 204), an AMF (e.g., AMF 206), a first UPF (UPF1) (e.g., UPF1 208), an Nth UPF (UPFn) (e.g., UPFn 210), and an operations and management (OAM) entity 212.

As shown by reference number 214, the SMF may transmit, to the NWDAF, an analytics message that requests or subscribes to analytics for UE-to-UPF latency. The SMF may be an analytics consumer SMF. The SMF may request or subscribe to the NWDAF for UE analytics related to uplink/downlink UE-to-UPF latency. The SMF may provide, via the analytics message, input information for an analytics ID, a target of analytics reporting such as a single UE or a group of UEs, and/or additional analytics filter information. The analytics filter information may include, a 5QI, slice information, and/or area of interest information and/or other parameters. As an example, the NWDAF analytics subscription (NWDAF_Analytic Subscription_Subscribe/Nwdaf_AnalyticInfo_Request) message may indicate Analytic ID=UE to UPF latency.

As shown by reference number 216, the NWDAF may transmit subscription-related signaling (Namf_EventExposure_Subscribe) to the AMF and/or receive notification-related signaling (Namf_EventExposure_Notify) from the AMF. The NWDAF may subscribe to location services from the AMF using an AMF event exposure subscribe (Namf_EventExposure_Subscribe) service for the collection of UE location(s) for a UE or a group of UEs of interest. Alternatively and/or in addition, for location information the NWDAF may subscribe to gateway mobile location center (GMLC) services.

As shown by reference number 218, the first UPF and the Nth UPF may each transmit a latency report to the OAM. For example, the first UPF may transmit a UE-to-UPF1 latency report to the OAM. The Nth UPF may transmit a UE-to-UPFn latency report to the OAM. As part of a UPF QOS monitoring mechanism, the OAM may collect UE-to- UPF latency information from UPFs serving the UE or the group of UEs of interest, per a configurable interval.

As shown by reference number 220, the NWDAF may transmit a data collection request to the OAM. The NWDAF may subscribe to input data from the OAM according to data collection principles from the OAM. The NWDAF may request, from the OAM, information on average uplink/downlink UE-to-UPF key performance indicators (KPIs), which may be collected per each request or per periodic reporting. The OAM may transmit a data response, which may indicate the information regarding the uplink/downlink UE-to-UPF KPIs. The uplink/downlink UE-to-UPF KPIs may include an average uplink/downlink packet delay (or latency) between the UE and the UPF.

As shown by reference number 222, the NWDAF may derive analytics information, which may include a statistical analysis of the average uplink/downlink latency of the UE or the group of UEs to various serving UPFs. Alternatively, or additionally, the analytics information may include a derived prediction, per expected location and time, of a UE-to-UPF latency or a latency of a group of UEs to the various serving UPFs.

As shown by reference number 224, the NWDAF may transmit an analytics information response (Nwdaf_AnalyticInfo_Request Response/Nnwdaf_AnalyticSubscription_Notify) to the SMF. The NWDAF may provide a requested latency analytics report to the SMF. The requested latency analytics report may indicate the analytics information derived by the NWDAF.

In some implementations, the SMF may receive, from the NWDAF, analytics information in response to the analytics message. The analytics information may indicate UE-to-UPF latency information for a downlink direction and/or an uplink direction. The analytics information may indicate a statistical analysis of an average uplink or downlink latency of a UE or a group of UEs to one or more serving UPFs. The analytics information may indicate a prediction, per expected location and time, of a UE-to-UPF latency or latency associated with the group of UEs to the one or more serving UPFs.

In some implementations, the UE-to-UPF latency information may include a UPF-to-UE downlink latency. The UPF-to-UE downlink latency may be based on a first timestamp associated with a local time of a downlink packet transmitted by a UPF, and a second timestamp associated with a local time that the downlink packet is received by a RAN and reported to the UPF. In some implementations, the UE-to-UPF latency information may include a UE-to-UPF uplink latency. The UE-to-UPF uplink latency may be based on a third timestamp associated with a local time of an uplink packet leaving the RAN, and a fourth timestamp associated with a local time that the uplink packet arrives at the UPF from the RAN.

As shown by reference number 226, the SMF may determine to modify a session and provide a lower latency path to sensitive applications. The SMF may determine to modify the session based on the analytics information. In other words, the SMF may determine to modify the session based on the statistical analysis of the average uplink/downlink latency of the UE or the group of UEs to various serving UPFs, or based on the derived prediction of the UE-to-UPF latency or the latency of the group of UEs to the various serving UPFs.

As shown by reference number 228, the SMF may transmit a session modify message to the first UPF and/or the Nth UPF. The SMF may transmit the session modify message to modify a PDU session. The PDU session may be modified based on a UPF selection, and the UPF selection may be based on the analytics information. The PDU session may be modified to provide a lower latency data path to a sensitive application. The PDU session may be modified during a PDU session establishment or after the PDU session establishment. By utilizing the analytics information related to UE-to-UPF latency, the SMF may select a UPF in a certain manner to modify the PDU session, thereby reducing latency and improving user experience and an overall network performance.

In some implementations, when modifying the PDU session, the SMF may insert an uplink classifier UPF in a data path. The uplink classifier UPF may be inserted as a branching point in the data path. The uplink classifier UPF may be inserted in the data path based on the session modify message. The SMF may insert the uplink classifier UPF to serve a low latency flow either directly or through a connection (e.g., an N9 connection) to local UPF PSA that serves the data path with reduced latency. In some implementations, when modifying the PDU session, the SMF may select a UPF PSA based on the session modify message. The UPF PSA may be selected during a PDU session establishment to match a latency service level agreement (SLA). The UPF PSA may be selected during the PDU session establishment to modify an ongoing PDU session by inserting an uplink classifier UPF in the data path and directing some flows to a low latency UPF and other flows to a high latency UPF.

In some implementations, the SMF, through an N4 interface and based on latency analytics (statistical or prediction), may insert the ULCL UPF in the data path. For example, the SMF may connect a low latency flow either directly, or through a local UPF PSA which may serve a flow with lower latency. Alternatively, the SMF may select a proper UPF PSA for a new establishing session in order to match the latency SLA, or the SMF may modify the ongoing PDU session by inserting an ULCL UPF in the data path and direct some flows to a low latency UPF1 and other flows to a higher latency UPFn.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
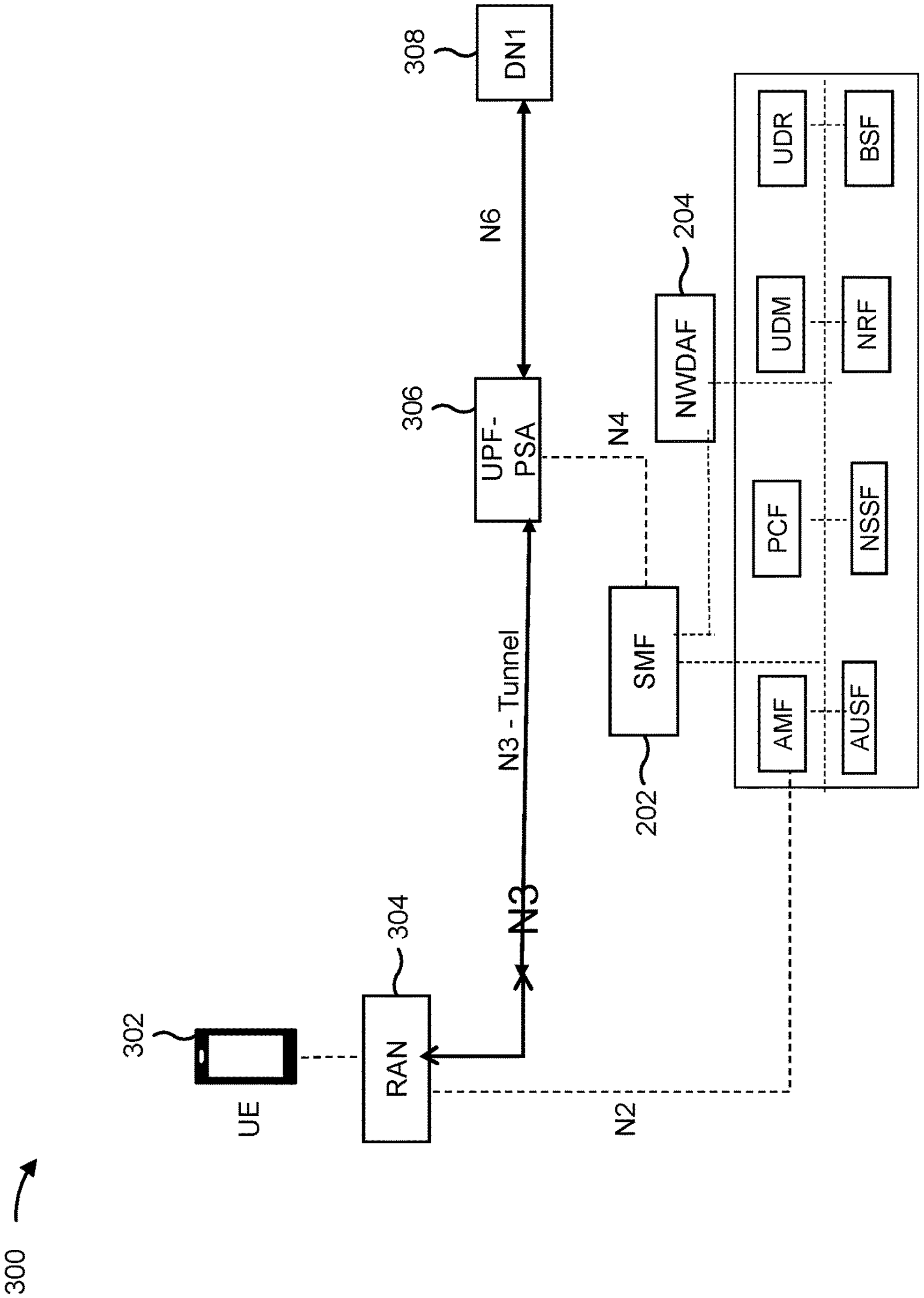
FIG. 3 is a diagram of an example associated with a network data analytics function (NWDAF) assisted session management function (SMF) selection of a UPF protocol data unit (PDU) session anchor (PSA).

FIG. 3 is a diagram of an example associated with an NWDAF assisted SMF selection of a PDU session anchor UPF. As shown in FIG. 3, example 300 includes a UE (e.g., UE 302), a RAN (e.g., RAN 304), a UPF PSA (e.g., UPF PSA 306), a first DN (DN1) (e.g., DN1 308), an SMF (e.g., SMF 202), and an NWDAF (e.g., NWDAF 204).

In some implementations, an NWDAF assisted SMF selection of a PDU session anchor UPF may be enabled. The SMF may select a UPF PSA (e.g., a most appropriate UPF PSA) to serve an application running on the first DN. The SMF may select the UPF PSA based on an analysis from the NWDAF. For example, the SMF may select the UPF PSA based on a prediction of an expected UE-to-UPF latency, and/or a UE location. The SMF may select the UPF PSA at a session initiation. Alternatively, the SMF may select the UPF PSA as part of a UPF swap at mid-session.

As indicated above, FIG. 3 is provided as an example. Other examples may differ from what is described with regard to FIG. 3.

Figure 4:
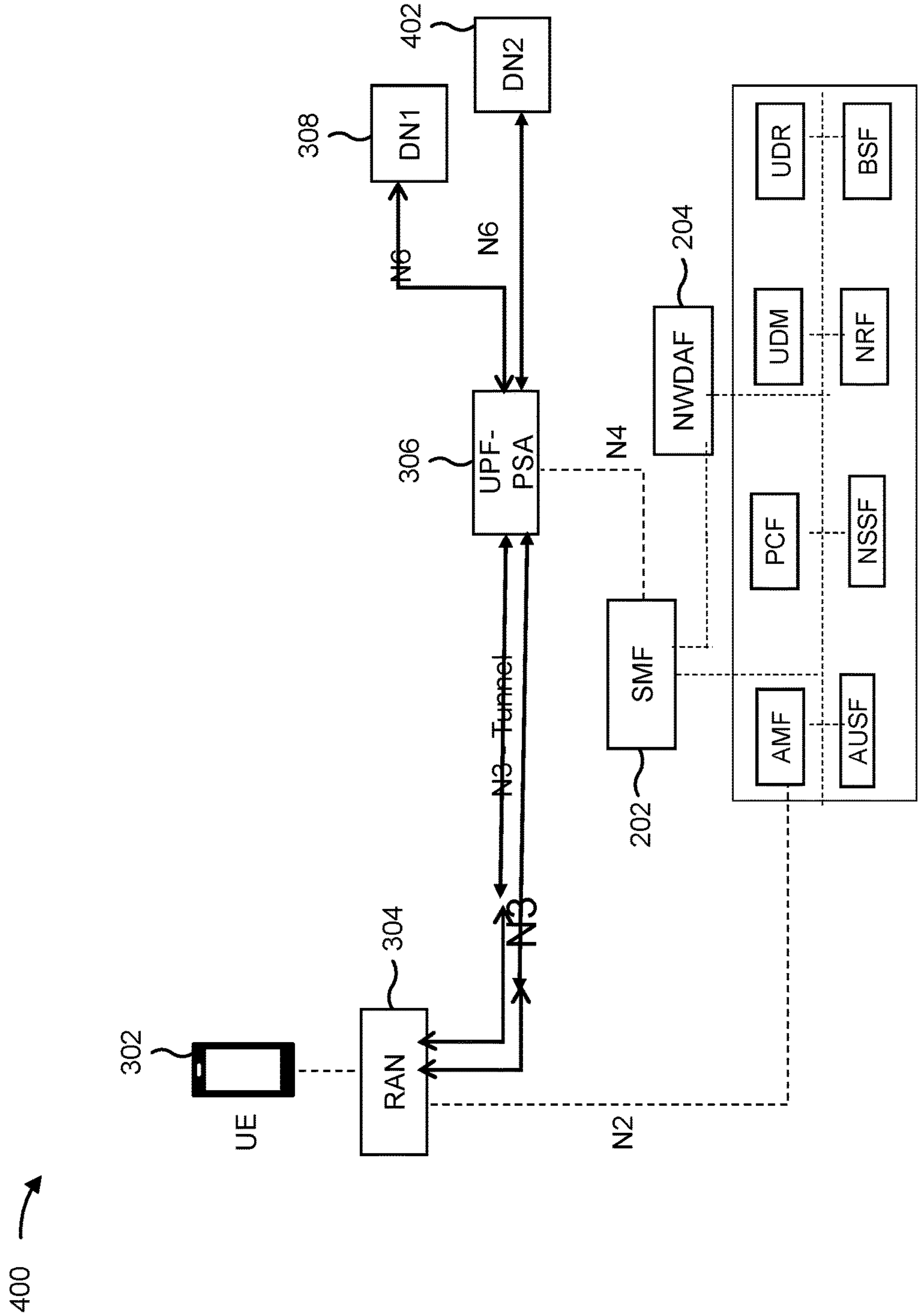
FIG. 4 is a diagram of an example associated with multiple Internet Protocol (IP) flows through a single UPF PSA.

FIG. 4 is a diagram of an example associated with multiple Internet Protocol (IP) flows through a single UPF PSA. As shown in FIG. 4, example 400 includes a UE (e.g., UE 302), a RAN (e.g., RAN 304), a UPF PSA (e.g., UPF PSA 306), a first DN (DN1) (e.g., DN1 308), a second DN (DN2) (e.g., DN2 402), an SMF (e.g., SMF 202), and an NWDAF (e.g., NWDAF 204). In this example, the first DN and the second DN may be remote DNs.

In some implementations, a network may serve two different flows through a single UPF PSA. The SMF, which may be an NWDAF-assisted SMF, may determine to serve two different IP flows to two different application servers through the same UPF PSA. The SMF may determine to serve the two different IP flows at a session establishment. The SMF may modify a decision to serve the two different IP flows based on NWDAF provided analytics, which may indicate an expected UE-to-UPF latency and/or a UE location.

As indicated above, FIG. 4 is provided as an example. Other examples may differ from what is described with regard to FIG. 4.

Figure 5:
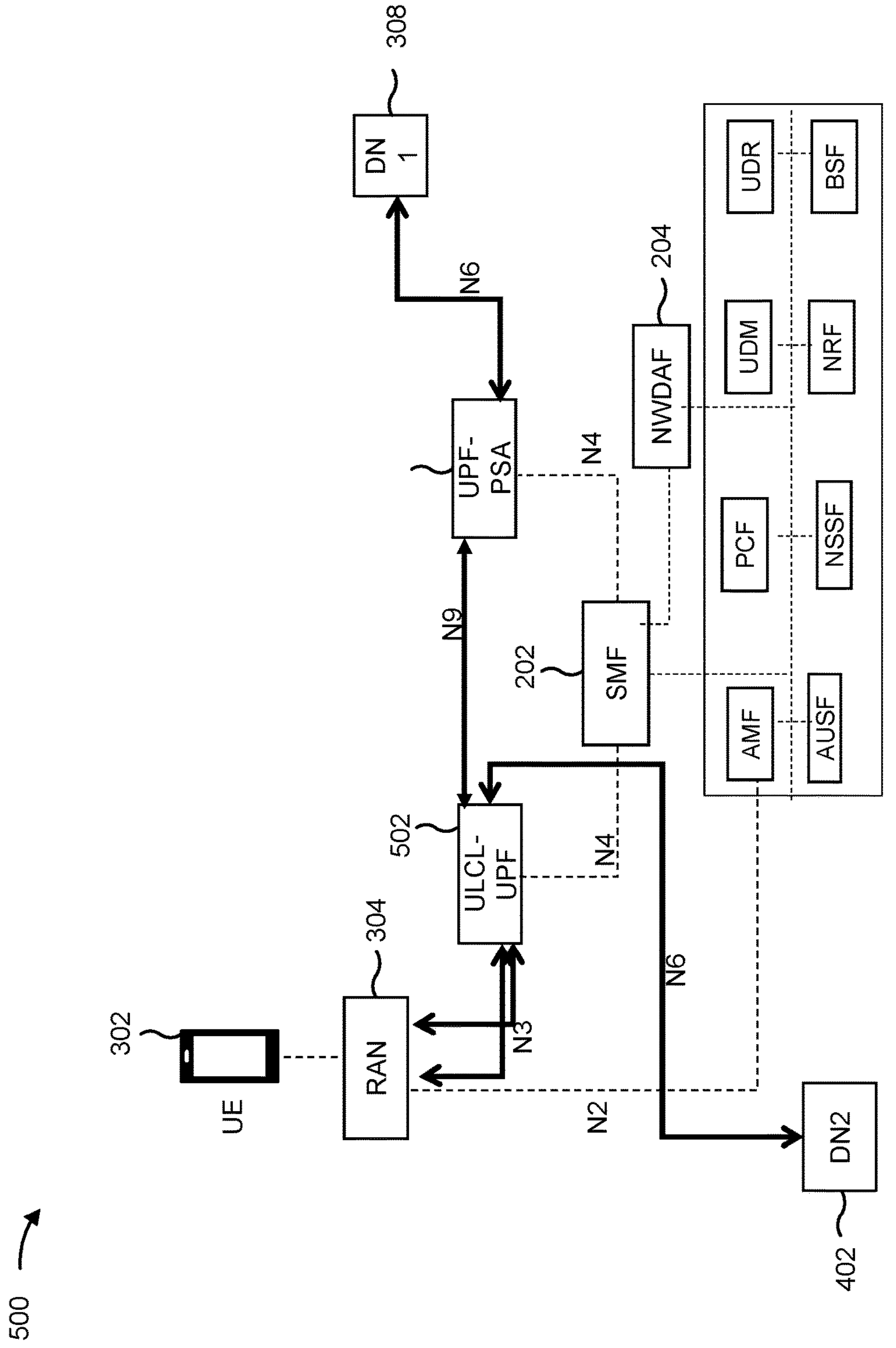
FIG. 5 is a diagram of an example associated with multiple IP flows of a single PDU session served by different UPFs based on an uplink classifier (UL CL) UPF insertion in the data path.

FIG. 5 is a diagram of an example associated with multiple IP flows served by different UPFs based on an ULCL-UPF insertion. As shown in FIG. 5, example 500 includes a UE (e.g., UE 302), a RAN (e.g., RAN 304), a UPF PSA (e.g., UPF PSA 306), a first DN (DN1) (e.g., DN1 308), a second DN (DN2) (e.g., DN2 402), an SMF (e.g., SMF 202), an NWDAF (e.g., NWDAF 204), and an uplink classifier UPF (ULCL-UPF) (e.g., ULCL-UPF 502). In this example, the first DN may be a remove DN and the second DN may be a local DN.

In some implementations, in an ULCL-UPF insertion, two different IP flows may be served by two different UPFs. The SMF, which may be an NWDAF-assisted SMF, may determine to serve the two different IP flows through different PDU anchor points. The SMF may determine to serve the two different IP flows at a session establishment or after the session establishment. The SMF may insert an ULCL-UPL in a data path, which may be based on NWDAF provided analytics. The NWDAF provided analytics may indicate an expected UE-to-UPF latency and/or a UE location, which the SMF may use to insert the ULCL-UPF in the data path. The SMF may add the UPF PSA and a branching point in accordance with a policy control function (PCF) procedures for establishing a PDU session and/or handle session mobility.

As indicated above, FIG. 5 is provided as an example. Other examples may differ from what is described with regard to FIG. 5.

Figure 6:
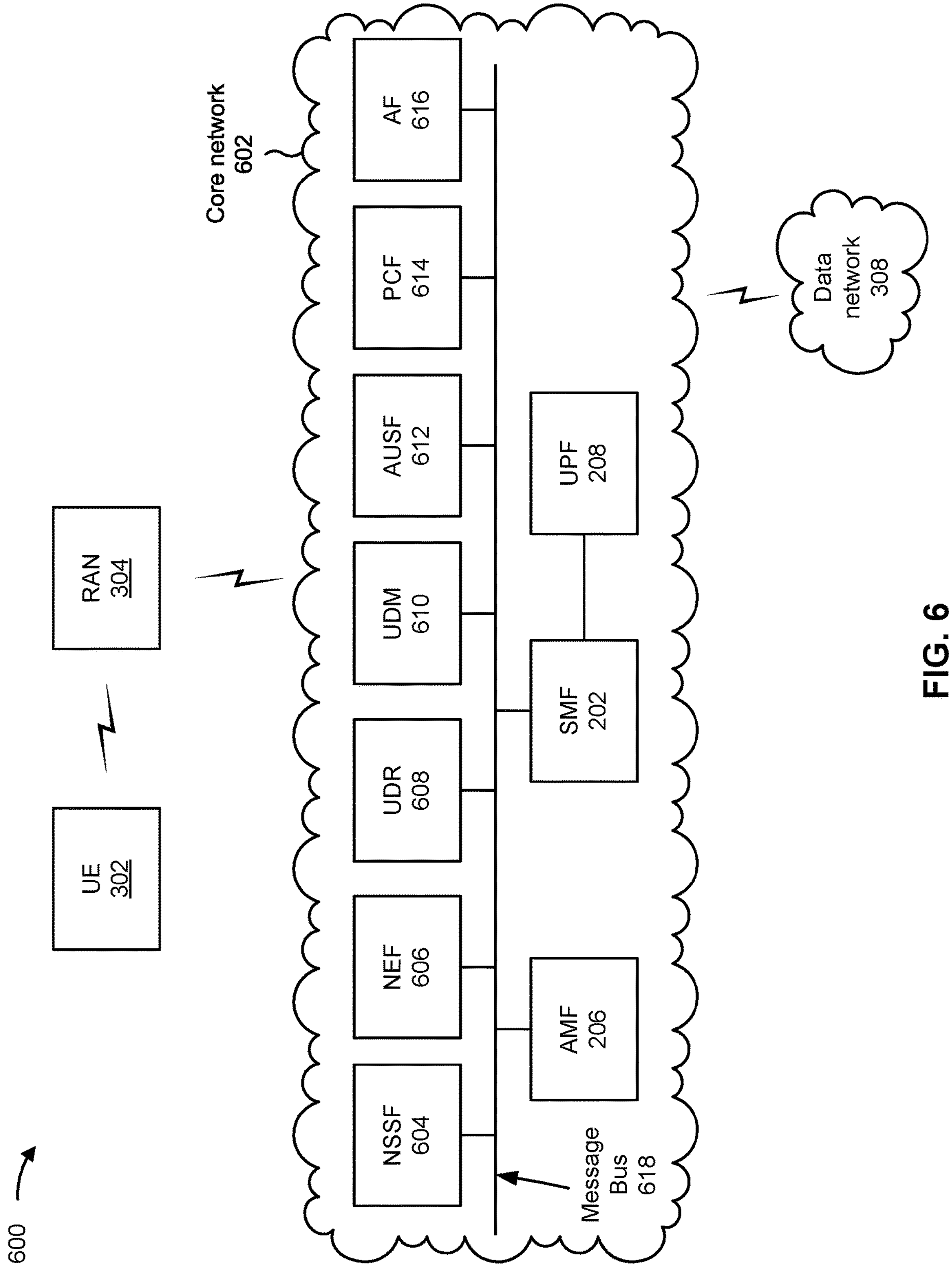
FIG. 6 is a diagram of an example environment in which systems and/or methods described herein may be implemented.

FIG. 6 is a diagram of an example environment 600 in which systems and/or methods described herein may be implemented. As shown in FIG. 6, example environment 600 may include a UE 302, a RAN 304, a core network 602, and a data network 308. Devices and/or networks of example environment 600 may interconnect via wired connections, wireless connections, or a combination of wired and wireless connections.

The UE 302 may include one or more devices capable of receiving, generating, storing, processing, and/or providing information, such as information described herein. For example, The UE 302 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 304 may support, for example, a cellular radio access technology (RAT). The RAN 304 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 302. A base station may be a disaggregated base station. The disaggregated base station may be configured to utilize a protocol stack that is physically or logically distributed among two or more nodes, which may include a radio unit (RU), a distributed unit (DU), and a centralized unit (CU). The RAN 304 may transfer traffic between the UE 302 (e.g., using a cellular RAT), one or more base stations (e.g., using a wireless interface or a backhaul interface, such as a wired backhaul interface), and/or the core network 602. The RAN 304 may provide one or more cells that cover geographic areas.

In some implementations, the RAN 304 may perform scheduling and/or resource management for the UE 302 covered by the RAN 304 (e.g., the UE 302 covered by a cell provided by the RAN 304). In some implementations, the RAN 304 may be controlled or coordinated by a network controller, which may perform load balancing, network-level configuration, and/or other operations. The network controller may communicate with the RAN 304 via a wireless or wireline backhaul. In some implementations, the RAN 304 may include a network controller, a self-organizing network (SON) module or component, or a similar module or component. In other words, the RAN 304 may perform network control, scheduling, and/or network management functions (e.g., for uplink, downlink, and/or sidelink communications of the UE 302 covered by the RAN 304).

In some implementations, the core network 602 may include an example functional architecture in which systems and/or methods described herein may be implemented. For example, the core network 602 may include an example architecture of a 5G next generation (NG) core network included in a 5G wireless telecommunications system. While the example architecture of the core network 602 shown in FIG. 6 may be an example of a service-based architecture, in some implementations, the core network 602 may be implemented as a reference-point architecture and/or a 4G core network, among other examples.

As shown in FIG. 6, the core network 602 include a number of functional elements. The functional elements may include, for example, a network slice selection function (NSSF) 604, a network exposure function (NEF) 606, a unified data repository (UDR) 608, a unified data management (UDM) 610, an authentication server function (AUSF) 612, a PCF 614, an AF 616, an AMF 206, an SMF 202, and/or a UPF 208. These functional elements may be communicatively connected via a message bus 618. Each of the functional elements shown in FIG. 6 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 604 may include one or more devices that select network slice instances for the UE 302. The NSSF 604 may allow an operator to deploy multiple substantially independent end-to-end networks potentially with the same infrastructure. In some implementations, each slice may be customized for different services. The NEF 606 may include one or more devices that support exposure of capabilities and/or events in the wireless telecommunications system to help other entities in the wireless telecommunications system discover network services.

The UDR 608 may include one or more devices that provide a converged repository, which may be used by network functions to store data. For example, a converged repository of subscriber information may be used to service a number of network functions. The UDM 610 may include one or more devices to store user data and profiles in the wireless telecommunications system. The UDM 610 may generate authentication vectors, perform user identification handling, perform subscription management, and perform other various functions. The AUSF 612 may include one or more devices that act as an authentication server and support the process of authenticating the UE 302 in the wireless telecommunications system.

The PCF 614 may include one or more devices that provide a policy framework that incorporates session management, network slicing, roaming, packet processing, QoS handling, and/or mobility management, among other examples. The AF 616 may include one or more devices that support application influence on traffic routing, access to the NEF 606, and/or policy control, among other examples. The AMF 206 may include one or more devices that act as a termination point for non-access stratum (NAS) signaling and/or mobility management, among other examples. The SMF 202 may include one or more devices that support the establishment, modification, and release of communication sessions in the wireless telecommunications system. For example, the SMF 202 may configure traffic steering policies at the UPF 208 and/or may enforce UE IP address allocation and policies, among other examples. The UPF 208 may include one or more devices that serve as an anchor point for intra-RAT and/or inter-RAT mobility. The UPF 208 may apply rules to packets, such as rules pertaining to packet routing, traffic reporting, and/or enforcing user plane QoS, among other examples. The message bus 618 may represent a communication structure for communication among the functional elements. In other words, the message bus 618 may permit communication between two or more functional elements.

The data network 308 may include one or more wired and/or wireless data networks (DNS). For example, the data network 308 may include an IP multimedia subsystem (IMS), application servers, a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of example environment 600 may perform one or more functions described as being performed by another set of devices of example environment 600.

Figure 7:
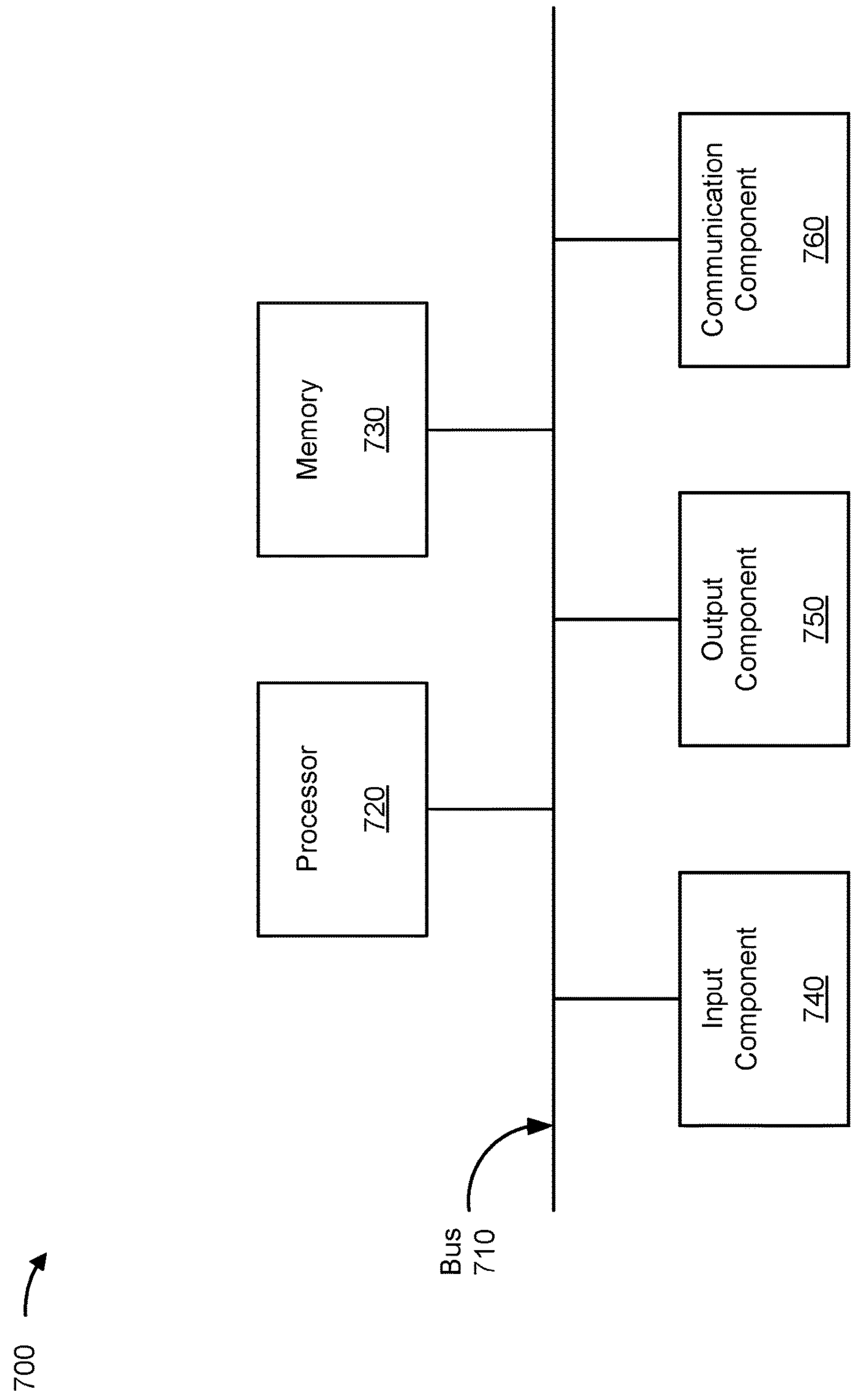
FIG. 7 is a diagram of example components of one or more devices of FIG. 6.

FIG. 7 is a diagram of example components of a device 700 associated with modifying sessions in accordance with a UPF selection based on latency. The device 700 may correspond to an SMF (e.g., SMF 202). Alternatively, the device 700 may correspond to an NWDAF (e.g., NWDAF 204), an AMF (e.g., AMF 206), or a UPF (e.g., UPF 208). In some implementations, the SMF may include one or more devices 700 and/or one or more components of the device 700. As shown in FIG. 7, the device 700 may include a bus 710, a processor 720, a memory 730, an input component 740, an output component 750, and/or a communication component 760.

The bus 710 may include one or more components that enable wired and/or wireless communication among the components of the device 700. The bus 710 may couple together two or more components of FIG. 7, such as via operative coupling, communicative coupling, electronic coupling, and/or electric coupling. For example, the bus 710 may include an electrical connection (e.g., a wire, a trace, and/or a lead) and/or a wireless bus. The processor 720 may include a central processing unit, a graphics processing unit, a microprocessor, a controller, a microcontroller, a digital signal processor, a field-programmable gate array, an application-specific integrated circuit, and/or another type of processing component. The processor 720 may be implemented in hardware, firmware, or a combination of hardware and software. In some implementations, the processor 720 may include one or more processors capable of being programmed to perform one or more operations or processes described elsewhere herein.

The memory 730 may include volatile and/or nonvolatile memory. For example, the memory 730 may include random access memory (RAM), read only memory (ROM), a hard disk drive, and/or another type of memory (e.g., a flash memory, a magnetic memory, and/or an optical memory). The memory 730 may include internal memory (e.g., RAM, ROM, or a hard disk drive) and/or removable memory (e.g., removable via a universal serial bus connection). The memory 730 may be a non-transitory computer-readable medium. The memory 730 may store information, one or more instructions, and/or software (e.g., one or more software applications) related to the operation of the device 700. In some implementations, the memory 730 may include one or more memories that are coupled (e.g., communicatively coupled) to one or more processors (e.g., processor 720), such as via the bus 710. Communicative coupling between a processor 720 and a memory 730 may enable the processor 720 to read and/or process information stored in the memory 730 and/or to store information in the memory 730.

The input component 740 may enable the device 700 to receive input, such as user input and/or sensed input. For example, the input component 740 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 750 may enable the device 700 to provide output, such as via a display, a speaker, and/or a light-emitting diode. The communication component 760 may enable the device 700 to communicate with other devices via a wired connection and/or a wireless connection. For example, the communication component 760 may include a receiver, a transmitter, a transceiver, a modem, a network interface card, and/or an antenna.

The device 700 may perform one or more operations or processes described herein. For example, a non-transitory computer-readable medium (e.g., memory 730) may store a set of instructions (e.g., one or more instructions or code) for execution by the processor 720. The processor 720 may execute the set of instructions to perform one or more operations or processes described herein. In some implementations, execution of the set of instructions, by one or more processors 720, causes the one or more processors 720 and/or the device 700 to perform one or more operations or processes described herein. In some implementations, hardwired circuitry may be used instead of or in combination with the instructions to perform one or more operations or processes described herein. Additionally, or alternatively, the processor 720 may be configured to perform one or more operations or processes described herein. Thus, implementations described herein are not limited to any specific combination of hardware circuitry and software.

The number and arrangement of components shown in FIG. 7 are provided as an example. The device 700 may include additional components, fewer components, different components, or differently arranged components than those shown in FIG. 7. Additionally, or alternatively, a set of components (e.g., one or more components) of the device 700 may perform one or more functions described as being performed by another set of components of the device 700.

Figure 8:
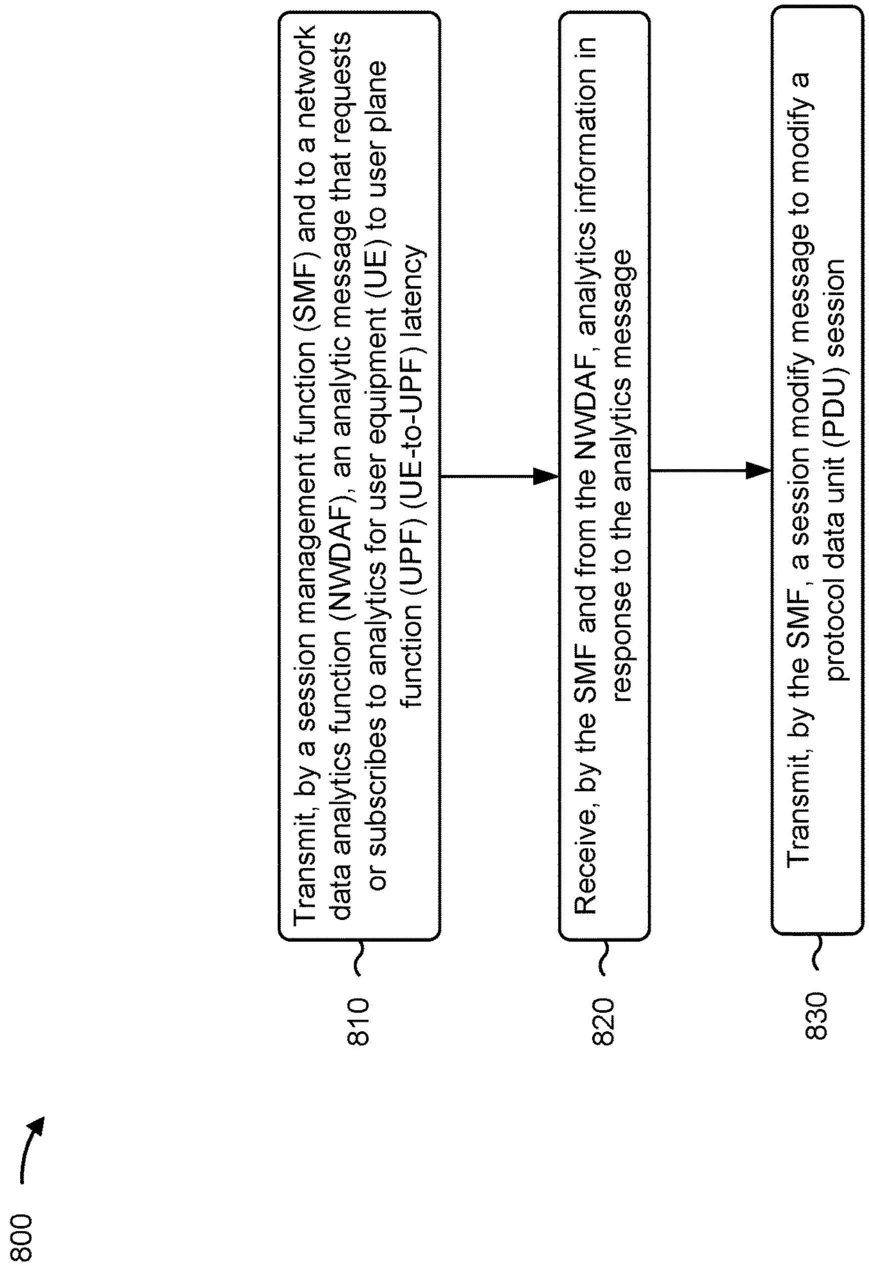
FIG. 8 is a flowchart of an example process associated with modifying sessions in accordance with a UPF selection based on latency.

FIG. 8 is a flowchart of an example process 800 associated with modifying sessions in accordance with a UPF selection based on latency. In some implementations, one or more process blocks of FIG. 8 may be performed by an SMF (e.g., SMF 202). Alternatively, one or more process blocks of FIG. 8 may be performed by an NWDAF (e.g., NWDAF 204), an AMF (e.g., AMF 206), or a UPF (e.g., UPF 208). In some implementations, one or more process blocks of FIG. 8 may be performed by another network element or a group of network elements separate from or including the SMF. Additionally, or alternatively, one or more process blocks of FIG. 8 may be performed by one or more components of device 700, such as processor 720, memory 730, input component 740, output component 750, and/or communication component 760.

As shown in FIG. 8, process 800 may include transmitting, by the SMF and to the NWDAF, an analytics message that requests or subscribes to analytics for UE-to-UPF latency (block 810). The analytics message may indicate an analytics identifier, a target of analytics reporting, and/or analytics filter information. The target of analytics reporting may include a single UE or a group of UEs. The analytics filter information may include a 5QI, slice information, area of interest information, and/or other parameters.

As shown in FIG. 8, process 800 may include receiving, by the SMF and from the NWDAF, analytics information in response to the analytics message, wherein the analytics information indicates UE-to-UPF latency information for one or more of a downlink direction or an uplink direction (block 820). The analytics information may indicate a statistical analysis of an average uplink or downlink latency of a UE or a group of UEs to one or more serving UPFs. The analytics information may indicate a prediction, per expected location and time, of a UE-to-UPF latency or latency associated with the group of UEs to the one or more candidate UPFs.

In some implementations, the UE-to-UPF latency information may include a UPF-to-UE downlink latency. The UPF-to-UE downlink latency may be based on a first timestamp associated with a local time of a downlink packet transmitted by a UPF, and a second timestamp associated with a local time that the downlink packet may be received by a RAN and reported to the UPF. The UE-to-UPF latency information may include a UE-to-UPF uplink latency. The UE-to-UPF uplink latency may be based on a third timestamp associated with a local time of an uplink packet leaving a RAN, and a fourth timestamp associated with a local time that the uplink packet arrives at the UPF from the RAN.

As shown in FIG. 8, process 800 may include transmitting, by the SMF, a session modify message to modify a PDU session, wherein the PDU session is to be modified based on a UPF selection, and the UPF selection is based on the analytics information (block 830). The PDU session may be modified to provide a lower latency data path to a sensitive application. The PDU session may be modified during a PDU session establishment or after the PDU session establishment. An uplink classifier UPF may be inserted in a data path based on the session modify message. The uplink classifier UPF may be inserted as a branching point in the data path. The SMF may insert the uplink classifier UPF and connect a low latency flow either directly or through a local UPF PSA that serves the data path with reduced latency. The uplink classifier UPF may be directly serving a low latency flow, or the uplink classifier UPF may be connected through a local UPF PSA that serves the data path with reduced latency. The UPF PSA may be selected based on the session modify message, and the UPF PSA may be selected during a PDU session establishment to match a latency SLA. The UPF PSA may be selected to modify an ongoing PDU session by inserting an uplink classifier UPF in the data path and directing some flows to a low latency UPF and other flows to a high latency UPF. The uplink classifier UPF may be inserted in the data path based on the session modify message, where the uplink classifier UPF may be inserted during an ongoing PDU session. A first flow associated with a first latency may be served by the uplink classifier UPF directly and a second flow associated with a second latency may be served by the uplink classifier UPF and a UPF PSA. The uplink classifier UPF and the UPF PSA may be connected using an N9 interface. The first flow may be directed to a low latency UPF, and a second flow may be directed to a higher latency UPF, in relation to the low latency UPF.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

transmitting, by a session management function (SMF) and to a network data analytics function (NWDAF), an analytics message that requests or subscribes to analytics for user equipment (UE) to user plane function (UPF) (UE-to-UPF) latency;

receiving, by the SMF and from the NWDAF, analytics information in response to the analytics message, wherein the analytics information indicates a prediction, per expected location and time, of the UE-to-UPF latency, wherein the UE-to-UPF latency is collected by an operations and management (OAM) entity and associated with at least a first UPF and a second UPF;

determining, by the SMF, to serve two different internet protocol (IP) flows to two different application servers of a protocol data unit (PDU) session through a single UPF, wherein a first IP flow, of the two different IP flows, is served via a first N6 interface of the single UPF to a first application server of the two different application servers, on a first data network, and wherein a second IP flow, of the two different IP flows, is served via a second N6 interface of the single UPF to a second application server, of the two different application servers, on a second data network;

selecting, by the SMF, the first UPF or the second UPF as the single UPF based on the analytics information; and transmitting, by the SMF, a session modify message to modify the PDU session based on selecting the first UPF or the second UPF.

2. The method of claim 1, wherein the analytics message indicates one or more of: an analytics identifier, a target of analytics reporting, or analytics filter information, wherein the target of analytics reporting includes a single UE or a group of UEs, and the analytics filter information includes one or more of a Fifth Generation quality of service identifier (5QI), slice information, or area of interest information.

3. The method of claim 1, wherein the analytics information indicates a statistical analysis of an average uplink or downlink latency of a UE or a group of UEs to one or more serving UPFs, including the first UPF and the second UPF, and the average uplink or downlink latency of the UE or the group of UEs to the UPFs is collected by an operations and management (OAM) entity in accordance with a configurable interval.

4. The method of claim 1, wherein the analytics information includes a UPF-to-UE downlink latency, and the UPF-to-UE downlink latency is based on a first timestamp associated with a local time of a downlink packet transmitted by the first UPF or the second UPF, and a second timestamp associated with a local time that the downlink packet is received by a radio access network (RAN) and reported to the first UPF or the second UPF.

5. The method of claim 1, wherein the analytics information includes a UE-to-UPF uplink latency, and the UE-to-UPF uplink latency is based on a third timestamp associated with a local time of an uplink packet leaving a radio access network (RAN), and a fourth timestamp associated with a local time that the uplink packet arrives at the first UPF or the second UPF from the RAN.

6. The method of claim 1, wherein the PDU session is modified during a PDU session establishment or after the PDU session establishment.

7. The method of claim 1, wherein the session modify message indicates that an uplink classifier UPF is to be inserted as a branching point in a data path, and a low latency flow is served directly by the uplink classifier UPF or through the single UPF connected to the uplink classifier UPF that serve the data path with reduced latency.

8. The method of claim 1, wherein a UPF PDU session anchor (PSA) is selected during a PDU session establishment to match a latency service level agreement (SLA).

9. The method of claim 1, wherein the session modify message indicates that an uplink classifier UPF is to be inserted as a branching point in a data path, the uplink classifier UPF is inserted during a PDU session, and a first flow associated with a first latency is served by the uplink classifier UPF and a second flow, associated with a second latency is served by the single UPF connected to the uplink classifier UPF.

10. The method of claim 1, wherein the NWDAF requests, from the OAM, information on average uplink/downlink UE-to-UPF key performance indicators (KPIs), which are collected per periodic reporting.

11. The method of claim 1, wherein the analytics message indicates a target of analytics reporting, wherein the target of analytics reporting includes a group of UEs, wherein the group of UEs include the UE and at least one other UE.

12. A network element, comprising:
- one or more hardware processors configured to:
  - transmit, to a network data analytics function (NWDAF), an analytics message that requests or subscribes to analytics for user equipment (UE) to user plane function (UPF) (UE-to-UPF) latency;
  - receive, from the NWDAF, analytics information in response to the analytics message,
    - wherein the analytics information indicates a prediction, per expected location and time, of the UE-to-UPF latency,
      - wherein the UE-to-UPF latency is collected by an operations and management (OAM) entity and is associated with at least a first UPF or a second UPF;
  - determine to serve two different internet protocol (IP) flows to two different application servers of a protocol data unit (PDU) session through a single UPF,
    - wherein a first IP flow, of the two different IP flows, is served via a first N6 interface of the single UPF to a first application server of the two different application servers, on a first data network, and
    - wherein a second IP flow, of the two different IP flows, is served via a second N6 interface of the single UPF to a second application server, of the two different application servers, on a second data network;
  - select the first UPF or the second UPF as the single UPF based on the analytics information; and
  - transmit a session modify message to modify the PDU session based on selecting the first UPF or the second UPF.

13. The network element of claim 12, wherein the one or more processors are further configured to:
- insert an uplink classifier UPF as a branching point in a data path, wherein the uplink classifier UPF is directly serving a low latency flow, or the uplink classifier UPF is connected through a local UPF PDU session anchor (PSA) that serves the data path with reduced latency.

14. The network element of claim 12, wherein a UPF PDU session anchor (PSA) is selected during a PDU session establishment to match a latency service level agreement (SLA).

15. The network element of claim 12, wherein the one or more processors are further configured to:
- insert an uplink classifier UPF as a branching point in a data path, wherein the uplink classifier UPF is inserted during an ongoing PDU session, and a first flow associated with a first latency is directly served by the uplink classifier UPF and a second flow associated with a second latency is served by a UPF PDU session anchor (PSA) connected to the uplink classifier UPF.

16. The network element of claim 12, wherein the NWDAF requests, from the OAM, information on average uplink/downlink UE-to-UPF key performance indicators (KPIs), which are collected per each request or per periodic reporting.

17. A non-transitory computer-readable medium storing a set of instructions, the set of instructions comprising:
- one or more instructions that, when executed by one or more processors of a network element, cause the network element to:
  - transmit an analytics message that requests or subscribes to analytics for user equipment (UE) to user plane function (UPF) (UE-to-UPF) latency;
  - receive analytics information in response to the analytics message,
    - wherein the analytics information indicates a prediction, per expected location and time, of the UE-to-UPF latency,
      - wherein the UE-to-UPF latency is collected by an operations and management (OAM) entity, associated with at least a first UPF or a second UPF;
  - determine to serve two different internet protocol (IP) flows to two different application servers of a protocol data unit (PDU) session through a single UPF,
    - wherein a first IP flow, of the two different IP flows, is served via a first N6 interface of the single UPF to a first application server of the two different application servers, on a first data network, and
    - wherein a second IP flow, of the two different IP flows, is served via a second N6 interface of the single UPF to a second application server, of the two different application servers, on a second data network;
  - select the first UPF or the second UPF as the single UPF based on the analytics information; and
  - transmit a session modify message to modify the PDU session based on selecting the first UPF or the second UPF.

18. The non-transitory computer-readable medium of claim 17, wherein the one or more instructions further cause the network element to:

insert an uplink classifier UPF as a branching point in a data path, wherein the uplink classifier UPF is directly serving a low latency flow, or the uplink classifier UPF is serving through a local UPF PDU session anchor (PSA) that serves the data path with reduced latency, and wherein the UPF PSA is selected during a PDU session establishment to match a latency service level agreement (SLA).

19. The non-transitory computer-readable medium of claim 17, wherein the one or more instructions, that cause the network element to modify the PDU session based on the analytical information, cause the network element to:

insert an uplink classifier UPF as a branching point in a data path, wherein the uplink classifier UPF is inserted during an ongoing PDU session, and a first flow associated with a first latency is directed to the uplink classifier UPF and a second flow associated with a second latency is directed to a UPF PDU session anchor (PSA).

20. The non-transitory computer-readable medium of claim 17, wherein the NWDAF requests, from the OAM, information on average uplink/downlink UE-to-UPF key performance indicators (KPIs), which are collected per each request.

* * * * *